US012154080B2

(12) United States Patent
Williams et al.

(10) Patent No.: US 12,154,080 B2
(45) Date of Patent: Nov. 26, 2024

(54) CRYPTOCURRENCY EXCHANGE WITHOUT BOND BACKING

(71) Applicant: Frontage Road Holdings, LLC, Wilmington, DE (US)

(72) Inventors: Josh Williams, San Francisco, CA (US); Raymond A. Chiapuzio, Eugene, OR (US)

(73) Assignee: Frontage Road Holdings, LLC, Wilmington, DE (US)

( * ) Notice: Subject to any disclaimer, the term of this patent is extended or adjusted under 35 U.S.C. 154(b) by 250 days.

(21) Appl. No.: 17/067,226

(22) Filed: Oct. 9, 2020

(65) Prior Publication Data

US 2021/0110360 A1    Apr. 15, 2021

Related U.S. Application Data

(60) Provisional application No. 62/913,579, filed on Oct. 10, 2019.

(51) Int. Cl.
| | | |
|---|---|---|
| *G06Q 20/06* | (2012.01) | |
| *G06Q 20/36* | (2012.01) | |
| *G06Q 20/40* | (2012.01) | |

(52) U.S. Cl.
CPC ..... *G06Q 20/0655* (2013.01); *G06Q 20/3674* (2013.01); *G06Q 20/3676* (2013.01); *G06Q 20/4014* (2013.01)

(58) Field of Classification Search
None
See application file for complete search history.

(56) References Cited

U.S. PATENT DOCUMENTS

| | | |
|---|---|---|
| 10,320,569 B1 | 6/2019 | Wentz et al. |
| 10,404,471 B1 | 9/2019 | Griffin et al. |
| 10,537,807 B2 | 1/2020 | Farudi et al. |

(Continued)

OTHER PUBLICATIONS

S. R. Tate and R. Vishwanathan, "Performance evaluation of TPM-based digital wallets," Proceedings of the 2010 International Symposium on Performance Evaluation of Computer and Telecommunication Systems (SPECTS '10), Ottawa, ON, Canada, 2010, pp. 179-186. (Year: 2010).*

(Continued)

*Primary Examiner* — Neha Patel
*Assistant Examiner* — Nicholas K Phan
(74) *Attorney, Agent, or Firm* — Hamilton, Brook, Smith & Reynolds, P.C.

(57) ABSTRACT

A system and corresponding method, for blockchain cryptocurrency exchange, track at least one pending blockchain transaction on a corresponding blockchain. The at least one pending blockchain transaction has been executed, but not yet committed, on the corresponding blockchain. The system and corresponding method determine whether an unexecuted blockchain transaction for cryptocurrency exchange is valid or invalid as a function of transaction information associated with the unexecuted blockchain transaction and the at least one pending blockchain transaction. The system and corresponding method output a result indicating whether the unexecuted blockchain transaction was determined to be valid or invalid, causing the unexecuted blockchain transaction to be executed or denied, respectively.

22 Claims, 5 Drawing Sheets

(56) References Cited

U.S. PATENT DOCUMENTS

| | | | |
|---|---|---|---|
| 10,579,974 B1 | 3/2020 | Reed | |
| 10,581,847 B1 | 3/2020 | Sun et al. | |
| 10,742,398 B2 | 8/2020 | Rosenoer et al. | |
| 10,751,628 B2 | 8/2020 | Packin et al. | |
| 11,288,736 B1 | 3/2022 | Jette et al. | |
| 11,295,359 B1* | 4/2022 | Mullins | G06Q 10/0837 |
| 11,308,487 B1* | 4/2022 | Foster | G06Q 20/3829 |
| 11,455,642 B1* | 9/2022 | Jameson | G06Q 20/405 |
| 11,468,431 B2 | 10/2022 | Williams et al. | |
| 11,880,809 B2 | 1/2024 | Williams et al. | |
| 11,922,402 B2 | 3/2024 | Williams et al. | |
| 2018/0349201 A1 | 12/2018 | Clark | |
| 2019/0051390 A1 | 2/2019 | Shah | |
| 2019/0158275 A1 | 5/2019 | Beck | |
| 2019/0304012 A1 | 10/2019 | Ramirez et al. | |
| 2019/0366475 A1 | 12/2019 | Scarselli et al. | |
| 2019/0370788 A1 | 12/2019 | Aronson | |
| 2020/0038761 A1 | 2/2020 | Packin et al. | |
| 2020/0042989 A1* | 2/2020 | Ramadoss | G06Q 50/167 |
| 2020/0118091 A1* | 4/2020 | Bartrim | G06Q 20/0855 |
| 2020/0143405 A1 | 5/2020 | Tucker | |
| 2020/0160320 A1 | 5/2020 | Williams et al. | |
| 2020/0184431 A1 | 6/2020 | Sinmao et al. | |
| 2021/0110384 A1* | 4/2021 | Vikstrom | G06Q 20/02 |
| 2021/0133700 A1 | 5/2021 | Williams et al. | |
| 2021/0326813 A1* | 10/2021 | Wang | G06F 16/2379 |
| 2021/0365930 A1* | 11/2021 | Fay | G06Q 20/3827 |
| 2022/0051235 A1* | 2/2022 | Ohashi | G06Q 20/027 |
| 2022/0084013 A1* | 3/2022 | Kulkarni | G06Q 20/3825 |
| 2023/0118511 A1 | 4/2023 | Williams et al. | |

OTHER PUBLICATIONS

Oraclize Dev Community, Oraclize, Nov. 20, 2018.*

Katalyse.io, What are Sidechains and Childchains?, Aug. 23, 2018, HackerNoon, hackernoon.com, downloaded Jul. 7, 2022. https://hackermoon.com/what-are-sidechains-and-childchains-7202cc9e5994, 7 pages.

Andreas M. Antonopoulos, Mastering Bitcoin, Dec. 1, 2014, O'Reilly Media, Inc. (Year: 2014).

* cited by examiner

CRYPTOCURRENCY EXCHANGE WITHOUT BOND BACKING

RELATED APPLICATION(S)

This application claims the benefit of U.S. Provisional Application No. 62/913,579, filed on Oct. 10, 2019. The entire teachings of the above application(s) are incorporated herein by reference.

BACKGROUND

A surety bond or surety is a promise by a surety or guarantor to pay one party a certain amount if a second party fails to meet some obligation, such as fulfilling the terms of a contract. The surety bond protects the obligee against losses resulting from the principal's failure to meet the obligation. As cryptocurrencies evolve from fringe investments to mainstream instruments, surety bonds may become an increasingly common requirement for those looking to trade in virtual currencies.

Ordinary surety bonds act as a contract between three parties: the entity requesting the bond (the principal), the bond's beneficiary (the obligee) and the company issuing the bond. What a surety bond does is guarantee that the principal will fulfill their obligations, whether it's completing a long-term project or processing a financial transaction, else forfeit the bond. Cryptocurrency surety bonds work in the same basic manner, ensuring that the principal performs cryptocurrency transactions as expected, else forfeit the bond. In this case, the contract is between the entity handling the virtual currency transaction, the regulatory entity requiring the surety bond, and the surety bond provider.

As cryptocurrencies like Bitcoin and Ethereum continue to flourish, federal and state regulators are coming to grips with their growing popularity in the financial sphere. Cryptocurrencies remain largely unregulated and there's been plenty of concern among financial experts of cryptocurrency enabling criminal activities like money laundering and tax evasion. As such, cryptocurrency surety bonds may be useful. Conventionally, a cryptocurrency surety bond is employed in a cryptocurrency exchange.

The three parties bound together in a cryptocurrency or money transmitter license bond are the state entity requiring the bond (the obligee), the money transmitter (the principal), and the company that underwrites and issues the bond (the surety). The required bond amount varies widely from state to state. A cryptocurrency bond is used to guarantee that the money transmitter conducts business in a completely lawful and ethical manner.

SUMMARY

It is desirable to create a trusted cryptocurrency exchange that does not rely on bond backing. According to an example embodiment, a system may be implanted to create cryptocurrency exchange without bond backing.

A computer-implemented method may comprise tracking at least one pending blockchain transaction on a corresponding blockchain, the at least one pending blockchain transaction having been executed, but not yet committed, on the corresponding blockchain. The computer-implemented method may comprise determining whether an unexecuted blockchain transaction for cryptocurrency exchange is valid or invalid as a function of transaction information associated with the unexecuted blockchain transaction and the at least one pending blockchain transaction. The computer-implemented method may comprise outputting a result of the determining, the result indicating whether the unexecuted blockchain transaction was determined to be valid or invalid.

The at least one pending blockchain transaction may include at least one pending cross-chain blockchain transaction, at least one sidechain blockchain transaction, or a combination thereof.

The transaction information associated with the at least one pending blockchain transaction may include data from the corresponding blockchain, a sidechain of the corresponding blockchain, at least one other blockchain, at least one sidechain of the at least one other blockchain, or a combination thereof.

The tracking, determining, and outputting may be performed by a smart contract.

The smart contract may be implemented as a centralized service accessible to other smart contracts. The centralized service may include at least one interface enabling the other smart contracts to log into the centralized service.

The computer-implemented method may further comprise receiving the unexecuted blockchain transaction from a smart contract to determine validity of the unexecuted blockchain transaction. The determining and outputting may be performed in response to the receiving.

The outputting may include sending the result to the smart contract.

The determining may include determining whether a conflict exists between the unexecuted blockchain transaction and the at least one pending blockchain transaction. The unexecuted blockchain transaction may be determined to be valid based on determining that the conflict does not exist and the unexecuted blockchain transaction may be determined to be invalid based on determining that the conflict does exist.

The computer-implemented method may further comprise computing an account balance based on the transaction information and determining whether the conflict exists based on the account balance computed.

In an event the account balance is computed to be negative, the conflict may be determined to exist. In an event the account balance is computed to be positive, the conflict may be determined not to exist.

The computer-implemented method may further comprise initiating the unexecuted blockchain transaction by a user. The transaction information may be associated with the user or a wallet address of a digital wallet owned by the user. The transaction information may include know your customer (KYC) information associated with the user.

The tracking may include storing the at least one pending blockchain transaction in a queue. The tracking may include removing the at least one pending blockchain transaction from the queue, in an event the at least one pending blockchain transaction is committed on the corresponding blockchain or removed from the corresponding blockchain.

The tracking, determining, and outputting may be implemented by a virtual machine.

According to another example embodiment, a system for blockchain cryptocurrency exchange may comprise a blockchain and a centralized service that is communicatively coupled to the blockchain. The centralized service may be configured to track at least one pending blockchain transaction, the at least one pending blockchain transaction having been executed, but not yet committed, on a corresponding blockchain. The centralized service may be configured to determine whether an unexecuted blockchain transaction for cryptocurrency exchange is valid or invalid as a function of transaction information associated with the unexecuted blockchain transaction and the at least one pending blockchain transaction. The centralized service may be configured to output a result, the result indicating whether the unexecuted blockchain transaction was determined to be valid or invalid.

Alternative system embodiments parallel those described above in connection with the example computer-implemented method embodiments.

It should be understood that example embodiments disclosed herein can be implemented in the form of a method, apparatus, computer-implemented system, or computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1A:
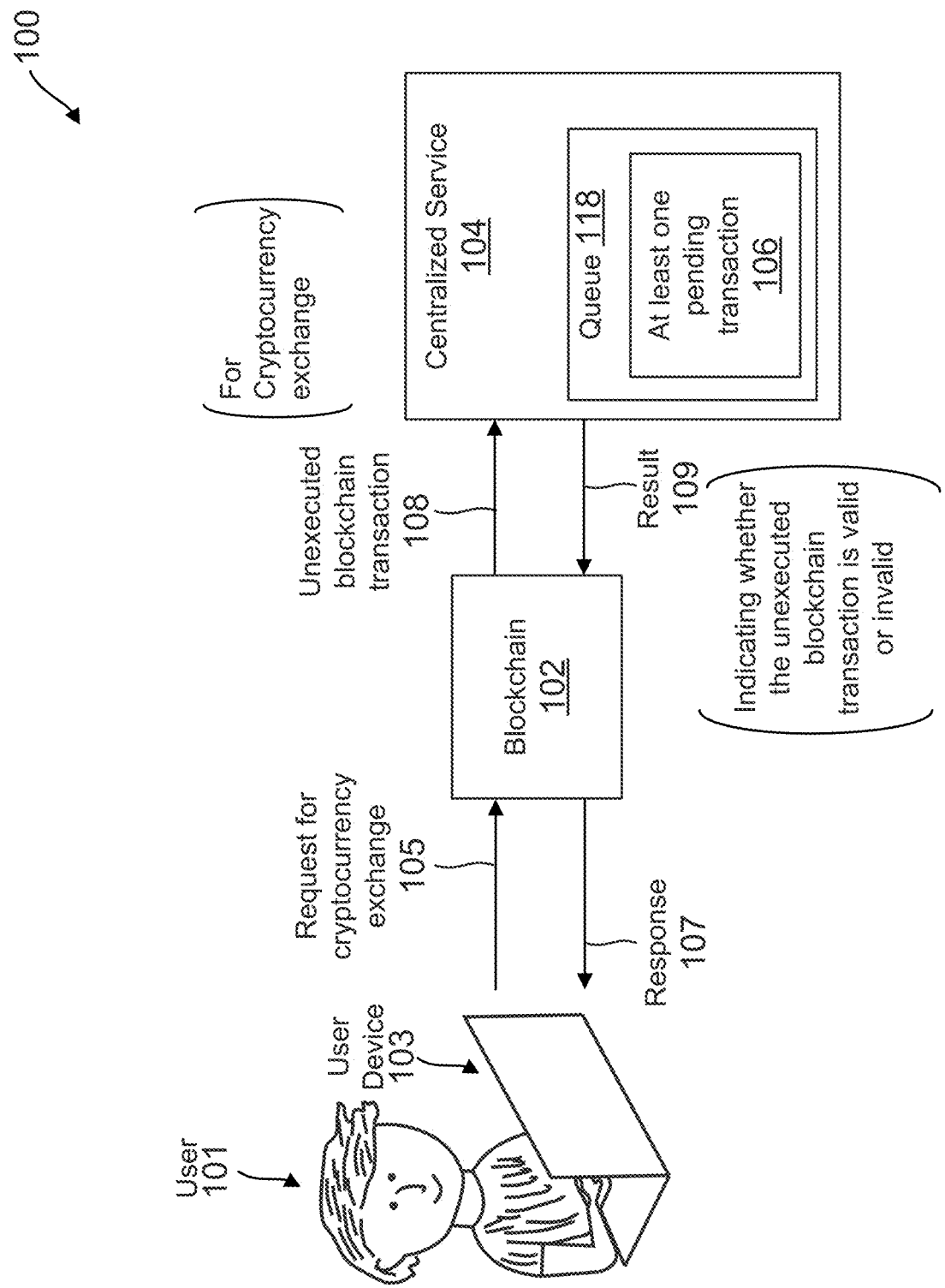
FIG. 1A is a block diagram of an example embodiment of a system for blockchain cryptocurrency exchange without bond backing.

A description of example embodiments follows.

It should be understood that the term "blockchain" as used herein includes all forms of electronic, computer-based, distributed ledgers. These include consensus-based blockchain and transaction-chain technologies, permissioned and un-permissioned ledgers, shared ledgers and variations thereof. While Bitcoin and Ethereum may be referred to herein for the purpose of convenience and illustration, it should be noted that the disclosure is not limited to use with the Bitcoin or Ethereum blockchains and alternative blockchain implementations and protocols fall within the scope of the present disclosure.

In general, blockchain is a write-once, append-many electronic ledger. Blockchain is an architecture that allows disparate users to make transactions and creates an unchangeable record of those transactions. A blockchain is a peer-to-peer, electronic ledger which is implemented as a computer-based decentralized, distributed computer-implemented system made up of blocks which, in turn, are made up of transactions. Each transaction is a data structure that encodes the transfer of control of a digital asset between participants in the blockchain computer-implemented system, and includes at least one input and at least one output.

Each block contains a hash of the previous block so that blocks become chained together to create a permanent, unalterable record of all transactions which have been written to the blockchain since its inception. Transactions contain small programs, known as scripts, embedded into their inputs and outputs, which specify how and by whom the outputs of the transactions can be accessed. As a peer-to-peer network, combined with a distributed time-stamping server, blockchain ledgers can be managed autonomously to exchange information between disparate parties; there's no need for an administrator. In effect, the blockchain users are the administrator.

In order to move anything of value over any kind of blockchain, a network of nodes must first agree that a transaction is valid. Based on such agreement, the transaction may be written to the blockchain, that is, committed to the blockchain. Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it should be i) validated by the first node that receives the transaction—if the transaction is validated, the node relays it to the other nodes in the network; and ii) added to a new block built by a miner; and iii) mined, i.e., added to the public ledger of past transactions.

An example embodiment includes a centralized service that may be configured to validate an unexecuted transaction and provide a result of the validation to a node. The node may use the result to determine whether or not to execute the unexecuted transaction. The validation by the centralized service may be performed prior to the validation that is performed by the network miner(s). As such, the validation that is performed by the centralized service may be referred to as "pre-validation" as it is performed on an unexecuted transaction that has not yet been submitted to miners for validation. The unexecuted transaction may be considered to be "unexecuted" as it has not yet been submitted to the miners on the blockchain.

Transactions that have been submitted to miners, but not validated or invalidated by the miners, may be referred to herein as "pending" transactions or "in-flight" transactions. According to an example embodiment, the centralized service may determine validity of an unexecuted transaction by determining its validity within a context of pending transactions of a blockchain(s).

According to an example embodiment, the centralized service may be implemented as a "smart contract." Unlike a traditional contract which would be written in natural language, a smart contract is a machine executable program which comprises rules that can process inputs in order to produce results, which can then cause actions to be performed dependent upon those results. For example, a smart contract may be employed to determine whether pre-determined conditions are met that prove someone owns a cryptocurrency and has authority to send money they claim to own. Smart contracts have numerous uses and may require more than one set of inputs to trigger a transaction.

According to an example embodiment, the centralized service may be configured to process an unexecuted transaction and produce a result, that is, an output that represents validity of the unexecuted transaction. The output may be employed to accept or deny the unexecuted transaction prior to its execution, obviating a need to back the unexecuted transaction with a bond because the unexecuted transaction has been validated within the context of pending transactions, as disclosed below with reference to FIG. 1A.

FIG. 1A is a block diagram of a system 100 for blockchain cryptocurrency exchange without bond backing. Cryptocurrency is generally a digital (i.e., electronic) form of currency recorded in a ledger of accounts and transactions (i.e., transfers) between peers using a method of encryption and verification. Unlike fiat currency, which is currency whose value is backed by the government that issues it, there is no central governing body that backs cryptocurrency. Bitcoin may be referred to as the first decentralized cryptocurrency. Since Bitcoin was created, numerous cryptocurrencies have been created. The example embodiment of FIG. 1A enables exchange of cryptocurrency without bond backing, where the cryptocurrency may be any suitable type of cryptocurrency.

The system 100 includes a blockchain 102 and a centralized service 104 that is communicatively coupled to the blockchain 102. According to an example embodiment, the centralized service 104 may be implemented on the blockchain 102. In the system 100, a user 101 submits a request 105 from a user device 103 for cryptocurrency exchange. The user device 103 may be any suitable user device, such as a mobile phone, desktop computer, laptop computer, tablet computer, personal digital assistant (PDA), or any other suitable computing device that is communicatively coupled to the blockchain 102 and enables the user 101 to initiate the request 105. The request 105 may be received by a node (not shown) of the blockchain 102, such as any of the nodes of the blockchain disclosed further below with reference to FIG. 2.

The node may not have access to all transaction information needed to determine whether or not to proceed with the unexecuted blockchain transaction 108 that is associated with the request 105. For example, transaction/state information that affects validity of the unexecuted blockchain transaction 108 may not have been written yet to the blockchain 102 and/or may reside on another blockchain(s). According to an example embodiment, the node may submit the unexecuted blockchain transaction 108 to the centralized service 104 that may have such visibility into such state/transaction information and, thus, can perform a check for whether or not the unexecuted blockchain transaction 108 for cryptocurrency exchange is valid in view of same.

For example, the user 101 may have an account with a balance of tokens and the request 105 may be a request to exchange a portion of the balance for a "card" in a game. It should be understood that such request to exchange tokens for a card is for illustrative purpose and that the request 105 may be any suitable request for cryptocurrency exchange. A smart contract (not shown) may be executed by the node on the blockchain 102 but may not have all the state/transaction information needed to determine whether the request 105 is valid. The smart contract may not have all the state/transaction information because a portion thereof may not have been written yet to blockchain 102 and/or may be located on a sidechain or other blockchain. The sidechain or other blockchain may have pending transactions that, upon completion, would cause the balance to be less than a number of tokens needed to purchase the card. As such, the request 105 may be invalid when evaluated in a context of such other pending transactions; however, the smart contract does not have visibility into such context.

According to an example embodiment, the smart contract on the node of the blockchain 102 may post the unexecuted blockchain transaction 108 to the centralized service 104 for approval. The centralized service 104 may evaluate validity of the unexecuted blockchain transaction 108 within a context of pending transactions of the blockchain 102 and other blockchains and may be configured to provide the smart contract with a result 109 that indicates whether the unexecuted blockchain transaction 108 is valid or invalid.

If valid, the smart contract may proceed with the request 105, by executing the unexecuted blockchain transaction 108 to transfer the tokens from the account in exchange for the card, and may provide a response 107 to the user device 103 indicating same. The user device 103 may, in turn, provide a status (not shown) of the request 105 to the user 101 via a user interface (not shown) based on the response 107. If invalid, the smart contract may refuse the request 105 and provide the response 107 that indicates same. The user device 103 may, in turn, provide the status to the user 101 via the user interface.

In order to provide the result 109, the centralized service 104 may be configured to track at least one pending blockchain transaction 106, the at least one pending blockchain transaction 106 having been executed, but not yet committed, on a corresponding blockchain. For example, the centralized service 109 may maintain a list of pending blockchain transactions in a queue 118. The list may be maintained in any suitable way, such as by storing the pending blockchain transactions or storing a reference to the pending blockchain transactions. According to an example embodiment, the corresponding blockchain may be the blockchain 102. Alternatively, the corresponding blockchain may be a sidechain (not shown) of the blockchain 102 or another blockchain (not shown).

The centralized service 104 may be configured to determine whether the unexecuted blockchain transaction 108 for cryptocurrency exchange is valid or invalid as a function of transaction information (not shown) that is associated with the unexecuted blockchain transaction 108 and the at least one pending blockchain transaction 106. The centralized service 104 may be configured to output the result 109. The result 109 may indicate whether the unexecuted blockchain transaction 108 was determined to be valid or invalid.

The at least one pending blockchain transaction 106 may include at least one pending cross-chain blockchain transaction (not shown), at least one sidechain blockchain transaction (not shown), or a combination thereof. The transaction information associated with the at least one pending blockchain transaction 106 may include data from the corresponding blockchain, a sidechain of the corresponding blockchain, at least one other blockchain, at least one sidechain of the at least one other blockchain, or a combination thereof.

The centralized service 104 may be a smart contract, as disclosed above. The smart contract may be written in any suitable programming language, such as the programming language "Solidity" on the basis of If-This-Then-That (IF-TTT) logic, or in any other suitable programming language. The smart contract may be accessible to other smart contracts (not shown), such as smart contracts of the blockchain 102 or other blockchains (not shown). The centralized service 104 may include at least one interface (not shown) that enables the other smart contracts to log into the centralized service 104. According to an example embodiment, the centralized service 104 may be implemented by a virtual machine (not shown).

The centralized service 104 may be further configured to determine whether the unexecuted blockchain transaction 108 for the cryptocurrency exchange is valid or invalid and output the result 109 in response to receiving the unexecuted blockchain transaction 108 from a smart contract (not shown) that is executed on the blockchain 102. To output the result 109, the centralized service 104 may be further configured to send the result 109 to the smart contract.

To determine whether the unexecuted blockchain transaction 108 for the cryptocurrency exchange is valid or invalid, the centralized service 104 may be further configured to determine whether a conflict exists between the unexecuted blockchain transaction 108 and the at least one pending blockchain transaction 106. The unexecuted blockchain transaction 108 may be determined to be valid based on determining that the conflict does not exist. Determining that the unexecuted blockchain transaction 108 is invalid may be based on determining that the conflict does exist.

The centralized service 104 may be further configured to compute an account balance based on the transaction information and determine whether the conflict exists based on the account balance computed. For example, in an event the account balance is computed to be negative, the centralized service 104 may be further configured to determine that the conflict does exist. In an event the account balance is computed to be positive, the centralized service may be further configured to determine that the conflict does not to exist.

The unexecuted blockchain transaction 108 may be initiated by the user 101 via the request 105. The transaction information may be associated with the user 101 or a wallet address of a digital wallet (not shown) owned by the user 101. The transaction information may include know your customer (KYC) information associated with the user, or any other suitable information associated with the user. According to an example embodiment, the centralized service 104 may be configured to connect with a KYC oracle to retrieve the KYC information.

The centralized service 104 may be further configured to store the at least one pending blockchain transaction 106 in the queue 118 and remove the at least one pending blockchain transaction 106 from the queue 118, in an event the at least one pending blockchain transaction 106 is committed on the corresponding blockchain or removed from the corresponding blockchain.

According to an example embodiment, all pending blockchain transactions have their corresponding transaction information posted (i.e., submitted) to the centralized service 104. Smart contracts executing on the blockchain 102 check in with the centralized service 104 to check whether an unexecuted blockchain transaction is listed and whether it conflicts with any pending blockchain transactions. According to an example embodiment, in an event there is a conflict, both conflicting transactions may be rejected. Alternatively, the first transaction of the conflicting transactions may be accepted based on having an earlier timestamp for submission relative to a timestamp of the transaction it conflicts with.

As disclosed above, the centralized service 104 may be implemented as a smart contract on the blockchain 102 and may serve as a centralized service (oracle) for smart contracts on the blockchain 102. The centralized service 104 may provide interfaces for the smart contracts to log into the centralized service 104. The centralized service 104 may be configured to send transaction information over the interfaces to the smart contracts to indicate whether transactions are approved or denied, that is, are determined to be valid or invalid, respectively. The smart contracts may execute transfers based on receiving approval of same from the centralized service 104. Such executed transfers may be captured in a block on the blockchain 102.

Figure 1B:
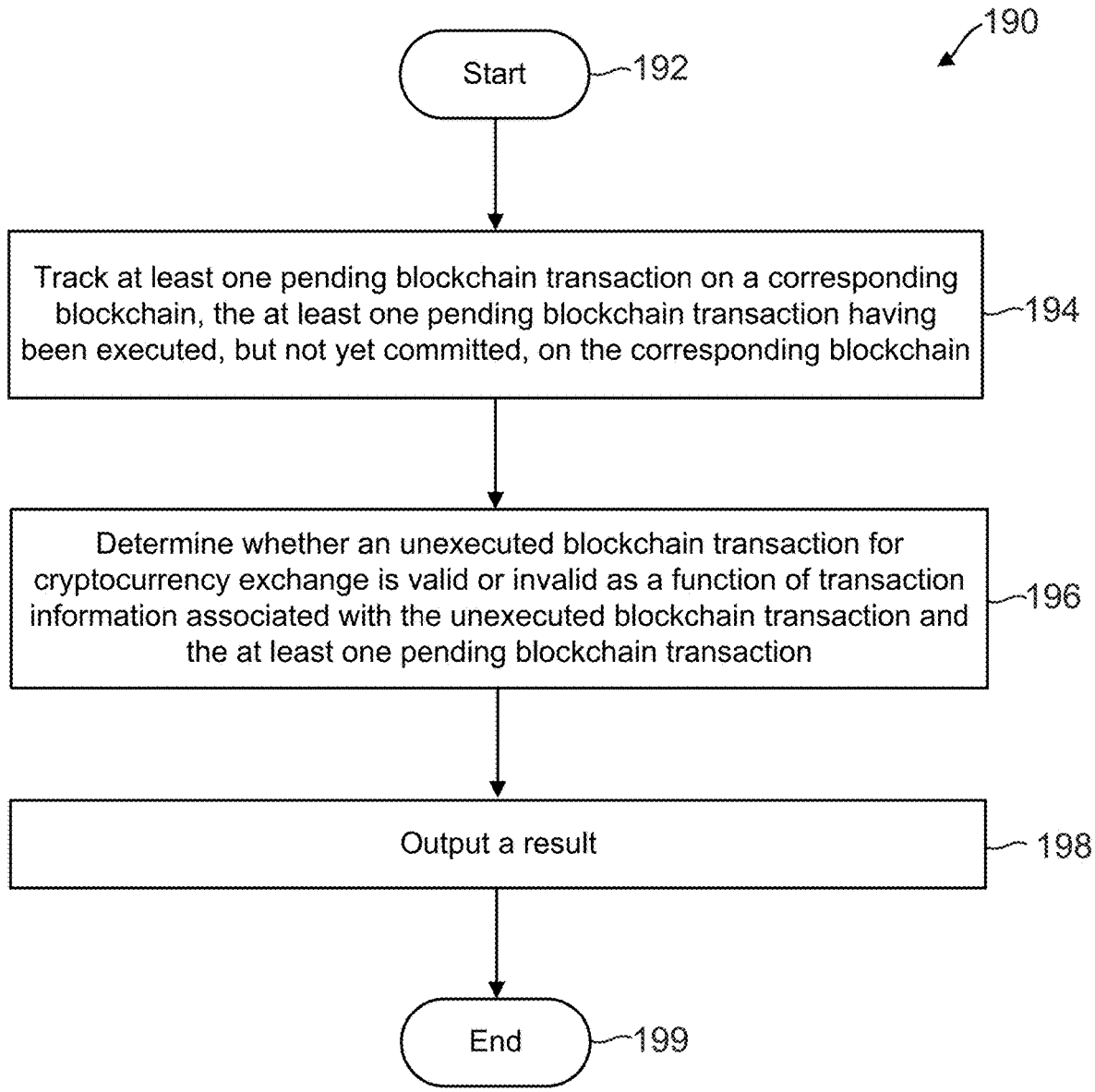
FIG. 1B is a flow diagram of an example embodiment of a computer-implemented method for blockchain cryptocurrency exchange without bond backing.

FIG. 1B is a flow diagram 190 of an example embodiment of a computer-implemented method for blockchain cryptocurrency exchange. The method begins (192) and tracks at least one pending blockchain transaction on a corresponding blockchain, the at least one pending blockchain transaction having been executed, but not yet committed, on the corresponding blockchain (194). The method determines whether an unexecuted blockchain transaction for cryptocurrency exchange is valid or invalid as a function of transaction information associated with the unexecuted blockchain transaction and the at least one pending blockchain transaction (196). The method outputs a result of the determining, the result indicating whether the unexecuted blockchain transaction was determined to be valid or invalid (198), and the method thereafter ends (199) in the example embodiment.

The tracking, determining, and outputting may be performed by a smart contract.

The computer-implemented method may further comprise receiving the unexecuted blockchain transaction from a smart contract to determine validity of the unexecuted blockchain transaction. The determining and outputting may be performed in response to the receiving.

The outputting may include sending the result to the smart contract.

The determining may include determining whether a conflict exists between the unexecuted blockchain transaction and the at least one pending blockchain transaction. The unexecuted blockchain transaction may be determined to be valid based on determining that the conflict does not exist and the unexecuted blockchain transaction may be determined to be invalid based on determining that the conflict does exist.

The computer-implemented method may further comprise computing an account balance based on the transaction information and determining whether the conflict exists based on the account balance computed. In an event the account balance is computed to be negative, the conflict may be determined to exist. In an event the account balance is computed to be positive, the conflict may be determined not to exist.

The computer-implemented method may further comprise initiating the unexecuted blockchain transaction by a user. The transaction information may be associated with the user or a wallet address of a digital wallet owned by the user. The transaction information may include know your customer (KYC) information associated with the user.

The tracking may include storing the at least one pending blockchain transaction in a queue. The tracking may include removing the at least one pending blockchain transaction from the queue, in an event the at least one pending blockchain transaction is committed on the corresponding blockchain or removed from the corresponding blockchain.

According to an example embodiment, the tracking, determining, and outputting may be implemented by a virtual machine.

Figure 1C:
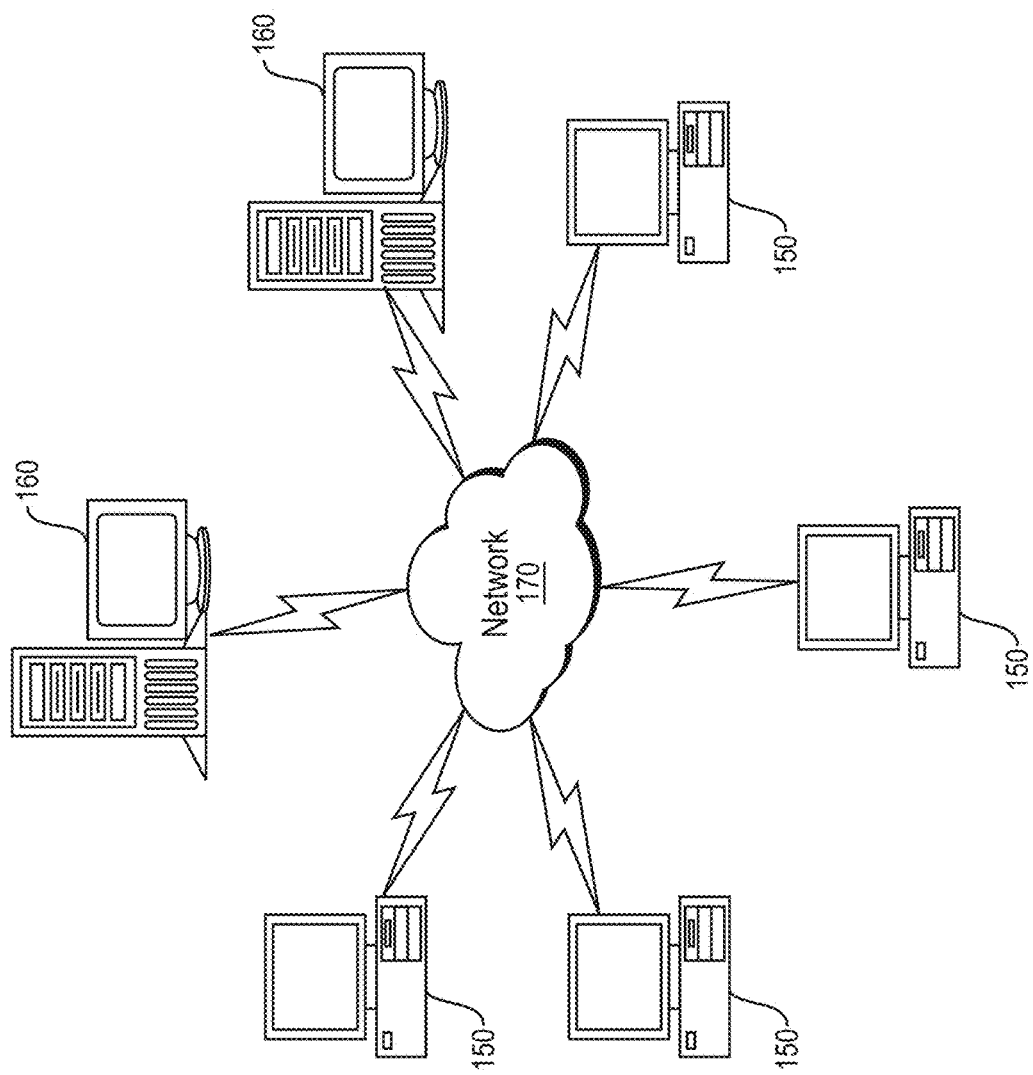
FIG. 1C is a block diagram of an example embodiment of a digital processing environment in which an example embodiment may be implemented.

FIG. 1C is a block diagram of an example digital processing environment in which an example embodiment may be implemented. Client computers/devices 150 and server computers/devices 160 provide processing, storage, and input/output devices executing application programs and the like.

Client computers/devices 150 are linked through communications network 170 to other computing devices, including other client computers/devices 150 and server computer(s) 160. The network 170 can be part of a remote access network, a global network (e.g., the Internet), a worldwide collection of computers, Local area or Wide area networks, and gateways that may use respective protocols (e.g., TCP/

IP, Bluetooth, etc.) to communicate with one another. Other electronic device/computer network architectures are suitable. For example, client computers/devices 150 may include nodes of the blockchain 102 of the system 100 of FIG. 1A. A digital wallet of the user 101 of FIG. 1A may be configured on each user device 310, 320 to store tokens. Client computers 150 of the computer-implemented system 101 may be configured with a trusted execution environment (TEE) or trusted platform module (TPM), where an application for cryptocurrency exchange may be run and the digital wallet of the user 101 may be stored.

Server computers 160 of the computer-implemented system may be configured to include a server that that executes the method 190 disclosed above with regard to FIG. 1B. For example, the application of the server computer 160 may determine whether the unexecuted blockchain transaction 108 is valid or invalid. The application of the server computer 160 also facilitates smart contracts to log in and post transactions that may be stored in the queue 118 of pending transactions. According to an example embodiment, server computers 160 or client devices 150 may comprise peer computing devices (nodes) 210, 220, 230, 240, 250, 260 of a distributed blockchain ledger 200 of FIG. 2, which use smart contracts to execute and record transactions.

Figure 1D:
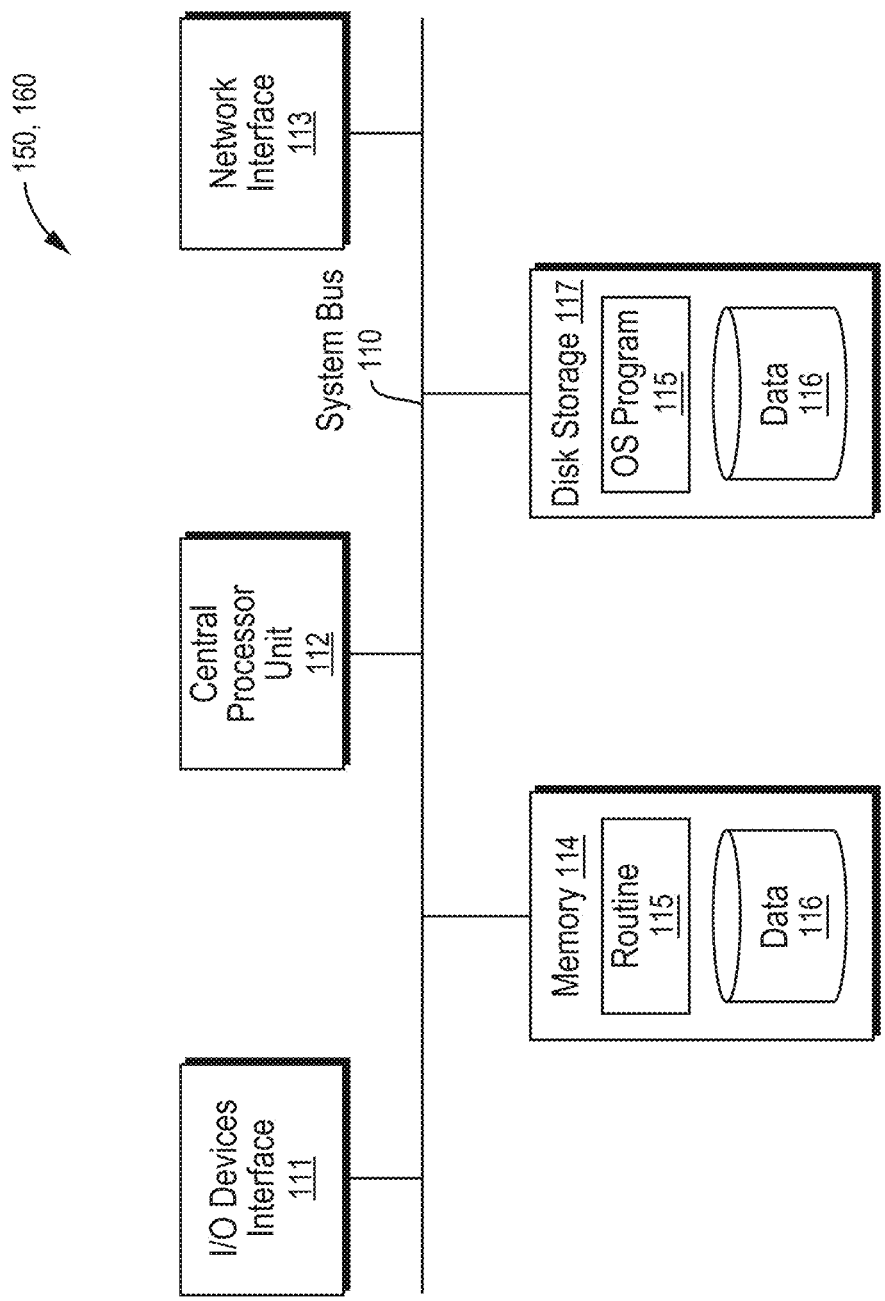
FIG. 1D is a block diagram of an example embodiment of an internal structure of a computer/computing node in the example embodiment of FIG. 1C.

FIG. 1D is a block diagram of an example embodiment of an internal structure of a computer/computing node (e.g., client processor/device/mobile phone device/tablet/video camera, or computer 150, 160) in the digital processing environment of FIG. 1C, which may be used to facilitate displaying audio, image, video or data signal information. An example embodiment may include means for displaying audio, image, video or data signal information. The computer 150, 160 in FIG. 1B may include a computer-implemented system bus 110, where a bus is a set of actual or virtual hardware lines used for data transfer among the components of a computer or processing computer-implemented system. Bus 110 is essentially a shared conduit that connects different elements of a computer computer-implemented system (e.g., processor, disk storage, memory, input/output ports, etc.) that enables the transfer of data between the elements.

Coupled to the computer-implemented system bus 110 is an I/O device interface 111 for connecting various input and output devices (e.g., keyboard, mouse, touch screen interface, displays, printers, speakers, audio inputs and outputs, video inputs and outputs, microphone jacks, etc.) to the computer 150, 160. The network interface 113 allows the computer to connect to various other devices attached to a network, such as the network 170 of FIG. 1C, disclosed above. The memory 114 provides volatile storage for computer software instructions 115 and data 116 used to implement applications and software implementations of components.

Software components 114, 115 of the computer-implemented system may be configured using any known programming language, including any high-level, object-oriented programming language. The computer-implemented system may include instances of processes that enable execution of transactions and recordation of transactions. The computer-implemented system may also include instances of a scoring engine, which can be implemented by the server 160 or a client that communicates to the server 160 using, for example, secure sockets layer (SSL), or any other suitable protocol, and computes a validity score associated with the unexecuted blockchain transaction 108.

In an example mobile implementation, a mobile agent implementation may be provided. A client-server environment can be used to enable mobile services using a network server. It can use, for example, the Extensible Messaging and Presence Protocol (XMPP) to tether an agent 115 on the device 150 to the server 160. The server 160 can then issue commands to the mobile device on request. The mobile user interface framework used to access certain components of the computer-implemented system 101 may be based on XHP, Javelin, or WURFL. In another example mobile implementation for OS X and iOS operating computer-implemented systems and their respective APIs, Cocoa and Cocoa Touch may be used to implement the client-side components 115 using Objective-C or any other high-level programming language that adds Smalltalk-style messaging to the C programming language.

The disk storage 117 provides non-volatile storage for computer software instructions 115 (equivalently "OS program") and data 116 used to implement embodiments of the computer-implemented system. The central processor unit 112 is also coupled to the computer-implemented system bus 110 and provides for the execution of computer instructions.

According to an example embodiment, the processor routines 115 and data 116 are computer program products, e.g. application 332, smart contracts, and scoring engine (generally referenced 115), including a computer readable medium capable of being stored on a storage device 117, which provides at least a portion of the software instructions for the computer-implemented system. Executing instances of respective software components of the computer-implemented system, such as instances of the application, smart contracts, and scoring engine may be implemented as computer program products 115, and can be installed by any suitable software installation procedure, as is well known in the art. In another example embodiment, at least a portion of the computer-implemented system software instructions 115 may also be downloaded over a cable, communication and/or wireless connection via, for example, a browser SSL session or through an app (whether executed from a mobile or other computing device). According to another example embodiment, the computer-implemented system software components 115 may be implemented as a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may provide at least a portion of the software instructions for the computer-implemented system.

An example embodiment includes device code executed in the TEE or TPM. The TEE or TPM is a hardware environment that runs instructions and stores data outside the main operating computer-implemented system (OS) of a device. This protects sensitive code and data from malware or snooping with purpose-built hardware governed by an ecocomputer-implemented system of endorsements, beginning with the device manufacturer. The computer-implemented system may perform checks on the TEE or TPM, such as executing BIOS checks, to verify that the folders (e.g., wallets) stored in the TEE/TPM have not been altered by malicious actors.

Figure 2:
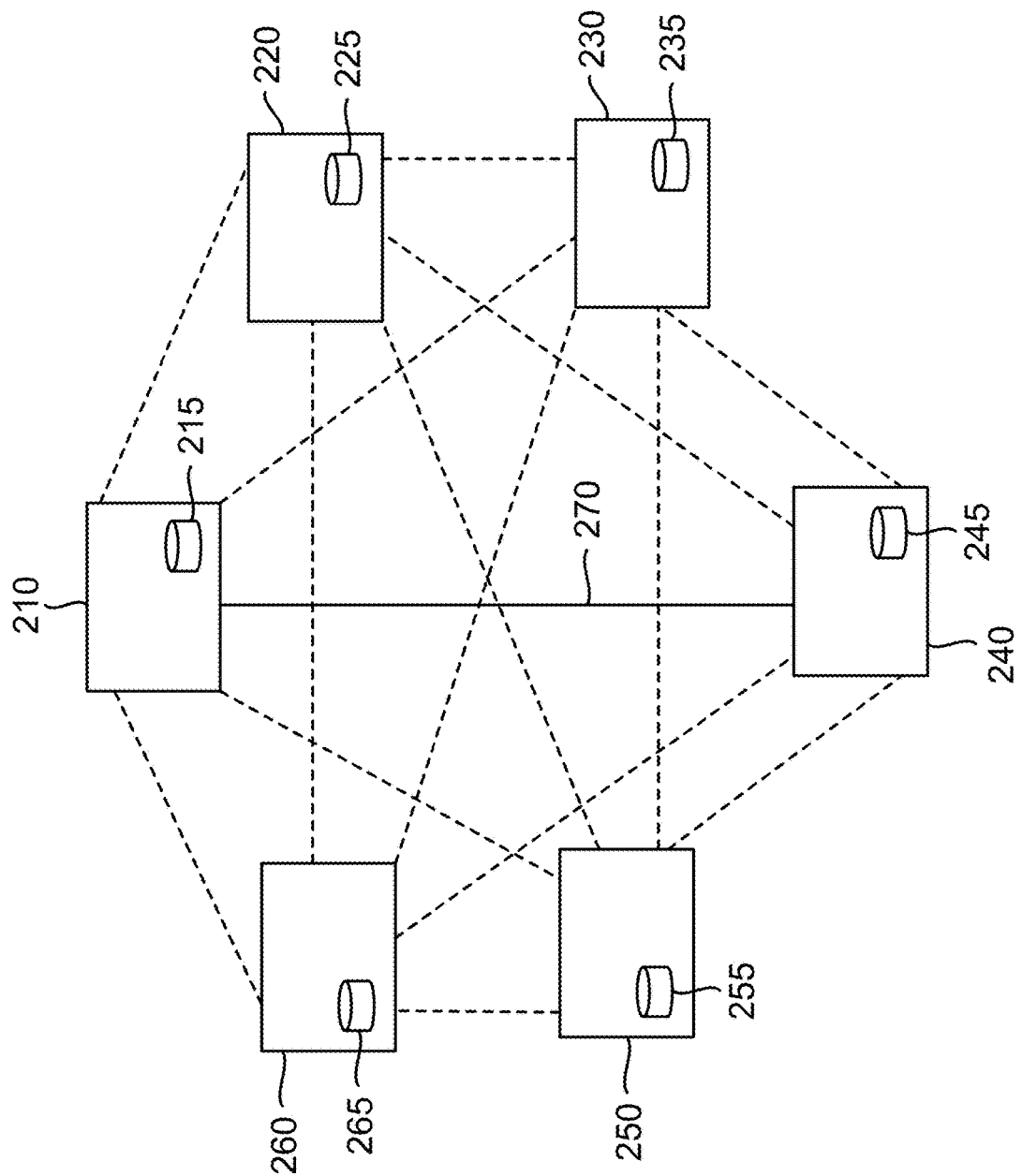
FIG. 2 is a block diagram of an example embodiment of a distributed blockchain ledger computer-implemented system.

FIG. 2 is a block diagram of an example embodiment of a blockchain network 200 that may be accessed according to an example embodiment. The blockchain network 200 may be employed as the blockchain network 102 of FIG. 1A, disclosed above. The blockchain network 200 is a distributed ledger peer-to-peer network and is valuable because this network enables trustworthy processing and recording of transactions without the need to fully trust any user (e.g., person, entity, program, and the like) involved in the transactions, reducing the need for trusted intermediaries to facilitate the transaction. Existing applications use the distributed ledger network 200 to transfer and record, in the form of blockchain based records, movement of tokens, that is, cryptocurrency. Such blockchain based records form a cryptographically secured backlinked list of blocks.

The distributed ledger network 200 comprises multiple computing devices configured as nodes 210, 220, 230, 240, 250, 260 of the distributed ledger network 200. Each node 210, 220, 230, 240, 250, 260 locally stores and maintains a respective identical copy 215, 225, 235, 245, 255, 265 of the blockchain ledger in memory communicatively coupled to the node. The nodes exchange messages within in the distributed ledger network 200 to update and synchronize the ledger stored and maintained by each node. The nodes may also execute decentralized applications (e.g., via smart contracts) for processing the messages. A message transmission 270 from node 210 to node 240 may be used to exchange a token in the distributed ledger network 200 as shown in FIG. 2. The dotted lines between each set of nodes in the distributed ledger network 200 indicate similar transmissions that may be exchanged between any other set of nodes in the distributed ledger network 200. The messages may include a confirmed transfer for recording data associated with the token being transferred, a blockchain public key for each of the one or more parties participating in the transfer (e.g., buyer and seller), and such.

Further example embodiments disclosed herein may be configured using a computer program product; for example, controls may be programmed in software for implementing example embodiments. Further example embodiments may include a non-transitory computer-readable medium containing instructions that may be executed by a processor which, when loaded and executed, cause the processor to complete methods described herein. It should be understood that elements of the block and flow diagrams may be implemented in software or hardware, such as via one or more arrangements of circuitry of FIG. 1D, disclosed above, or equivalents thereof, firmware, a combination thereof, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

While example embodiments have been particularly shown and described, it will be understood by those skilled in the art that various changes in form and details may be made therein without departing from the scope of the embodiments encompassed by the appended claims.

What is claimed is:

1. A computer-based system for blockchain cryptocurrency exchange, the computer-based system comprising:
a first computing node including at least one processor and configured to implement a trusted bondless cryptocurrency exchange,
the trusted bondless cryptocurrency exchange configured to approve blockchain transactions via a trusted blockchain system without requiring bond backing, the trusted blockchain system implemented on a blockchain computer network including multiple blockchain computing nodes,
at least one of the multiple blockchain computing nodes configured to enable trusted processing and recording of blockchain transactions; and
a second computing node including at least one processor and configured to implement a virtual machine oracle, the virtual machine oracle communicatively coupled to the trusted blockchain system,
the virtual machine oracle being accessible to at least one smart contract,
the virtual machine oracle including at least one interface enabling the at least one smart contract to log into the virtual machine oracle,
the virtual machine oracle configured to handle conflict resolution of blockchain transactions by:
tracking at least one pending blockchain transaction, the at least one pending blockchain transaction having been executed, but not yet committed, on a corresponding blockchain;
identifying an unexecuted blockchain transaction for cryptocurrency exchange that does not have bond backing;
verifying whether the identified unexecuted blockchain transaction is configured with bond backing; and
responsive to verifying that the identified unexecuted blockchain transaction is configured without bond backing:
determining whether the identified unexecuted blockchain transaction is valid or invalid as a function of transaction information associated with the identified unexecuted blockchain transaction and the at least one pending blockchain transaction;
verifying the identified unexecuted blockchain transaction is associated with an unaltered digital wallet executing in a trusted execution environment (TEE) or trusted platform module (TPM); and
outputting a result, the result indicating whether the identified unexecuted blockchain transaction was determined to be valid or invalid.

2. The system of claim 1, wherein the at least one pending blockchain transaction includes at least one pending cross-chain blockchain transaction, at least one sidechain blockchain transaction, or a combination thereof.

3. The system of claim 1, wherein the transaction information associated with the at least one pending blockchain transaction includes data from the corresponding blockchain, a sidechain of the corresponding blockchain, at least one other blockchain, at least one sidechain of the at least one other blockchain, or a combination thereof.

4. The system of claim 1, wherein the virtual machine oracle is further configured to determine whether the identified unexecuted blockchain transaction is valid or invalid and output the result in response to receiving the identified unexecuted blockchain transaction from a smart contract executed on the corresponding blockchain.

5. The system of claim 4, wherein to output the result, the virtual machine oracle is further configured to send the result to the smart contract.

6. The system of claim 1, wherein to determine whether the identified unexecuted blockchain transaction is valid or invalid, the virtual machine oracle is further configured to determine whether a conflict exists between the unexecuted blockchain transaction and the at least one pending blockchain transaction, wherein the identified unexecuted blockchain transaction is determined to be valid based on determining that the conflict does not exist, and wherein determining that the identified unexecuted blockchain transaction is invalid is based on determining that the conflict does exist.

7. The system of claim 6, wherein the virtual machine oracle is further configured to:
compute an account balance based on the transaction information; and
determine whether the conflict exists based on the account balance computed.

8. The system of claim 6, wherein, in an event the account balance is computed to be negative, the virtual machine oracle is further configured to determine that the conflict does exist, and wherein, in an event the account balance is computed to be positive, the virtual machine oracle is further configured to determine that the conflict does not exist.

9. The system of claim 1, wherein the identified unexecuted blockchain transaction is initiated by a user and wherein the transaction information is associated with the user or a wallet address of a digital wallet owned by the user.

10. The system of claim 1, wherein the identified unexecuted blockchain transaction is initiated by a user and wherein the transaction information includes know your customer (KYC) information associated with the user.

11. The system of claim 1, wherein the virtual machine oracle is further configured to:
store the at least one pending blockchain transaction in a queue; and
remove the at least one pending blockchain transaction from the queue, in an event the at least one pending blockchain transaction is committed on the corresponding blockchain or removed from the corresponding blockchain.

12. A computer-implemented method for blockchain cryptocurrency exchange, the computer-implemented method comprising, by one or more processors of one or more computing nodes:
implementing a trusted bondless cryptocurrency exchange without bond backing by, via a virtual machine oracle, the virtual machine oracle being accessible to at least one smart contract, the virtual machine oracle including at least one interface enabling the at least one smart contract to log into the virtual machine oracle:
tracking at least one pending blockchain transaction on a corresponding blockchain, the at least one pending blockchain transaction having been executed, but not yet committed, on the corresponding blockchain;
identifying an unexecuted blockchain transaction for cryptocurrency exchange that does not have bond backing;
verifying whether the identified unexecuted blockchain transaction is configured with bond backing; and
responsive to verifying that the identified unexecuted blockchain transaction is configured without bond backing:
determining whether the identified unexecuted blockchain transaction is valid or invalid as a function of transaction information associated with the identified unexecuted blockchain transaction and the at least one pending blockchain transaction;
verifying the identified unexecuted blockchain transaction is associated with an unaltered digital wallet executing in a trusted execution environment (TEE) or trusted platform module (TPM); and
outputting a result of the determining, the result indicating whether the identified unexecuted blockchain transaction was determined to be valid or invalid.

13. The method of claim 12, wherein the at least one pending blockchain transaction includes at least one pending cross-chain blockchain transaction, at least one sidechain blockchain transaction, or a combination thereof.

14. The method of claim 12, wherein the transaction information associated with the at least one pending blockchain transaction includes data from the corresponding blockchain, a sidechain of the corresponding blockchain, at least one other blockchain, at least one sidechain of the at least one other blockchain, or a combination thereof.

15. The method of claim 12, further comprising, via the virtual machine oracle, receiving the identified unexecuted blockchain transaction from a smart contract executed on the corresponding blockchain, and wherein the determining and outputting are performed in response to the receiving.

16. The method of claim 15, wherein the outputting includes sending the result to the smart contract.

17. The method of claim 12, wherein the determining includes determining whether a conflict exists between the identified unexecuted blockchain transaction and the at least one pending blockchain transaction, and wherein the identified unexecuted blockchain transaction is determined to be valid based on determining that the conflict does not exist, and wherein determining that the identified unexecuted blockchain transaction is invalid is based on determining that the conflict does exist.

18. The method of claim 17, further comprising, via the virtual machine oracle, computing an account balance based on the transaction information, and wherein determining whether the conflict exists is based on the account balance computed.

19. The method of claim 17, wherein, in an event the account balance is computed to be negative, the conflict is determined to exist, and wherein, in an event the account balance is computed to be positive, the conflict is determined not to exist.

20. The method of claim 12, further comprising, via the virtual machine oracle, initiating the identified unexecuted blockchain transaction on behalf of a user, and wherein the transaction information is associated with the user or a wallet address of a digital wallet owned by the user.

21. The method of claim 12, further comprising, via the virtual machine oracle, initiating the identified unexecuted blockchain transaction on behalf of a user, and wherein the transaction information includes know your customer (KYC) information associated with the user.

22. The method of claim 12, wherein the tracking includes:
storing the at least one pending blockchain transaction in a queue; and
removing the at least one pending blockchain transaction from the queue, in an event the at least one pending blockchain transaction is committed on the corresponding blockchain or removed from the corresponding blockchain.

* * * * *